United States Patent [19]

Wilson

[11] Patent Number: 5,054,716
[45] Date of Patent: Oct. 8, 1991

[54] DRIVE SYSTEM FOR TILTROTOR AIRCRAFT

[75] Inventor: Harold K. Wilson, Arlington, Tex.

[73] Assignee: Bell Helicopter Textron Inc., Fort Worth, Tex.

[21] Appl. No.: 422,140

[22] Filed: Oct. 16, 1989

[51] Int. Cl.$^5$ ............... B64C 29/00; B64C 27/52; B64D 35/06; B64D 35/08
[52] U.S. Cl. ............... 244/56; 244/7 R; 244/7 C; 244/60; 244/66
[58] Field of Search ............... 244/7 R, 7 C, 66, 60, 244/56, 58, 69

[56] References Cited

U.S. PATENT DOCUMENTS

| | | | |
|---|---|---|---|
| 3,059,876 | 10/1962 | Platt | 244/7 C |
| 3,073,547 | 1/1963 | Fischer | 244/7 C |
| 3,107,881 | 10/1963 | Stuart | 244/7 C |
| 3,136,499 | 6/1964 | Kessler | 244/7 C |
| 3,166,271 | 1/1965 | Zuck | 244/7 C |
| 3,231,221 | 1/1966 | Platt | 244/7 R X |

Primary Examiner—Margaret A. Focarino
Assistant Examiner—James M. Kannofsky
Attorney, Agent, or Firm—Robert A. Felsman

[57] ABSTRACT

A drive system for a tiltrotor aircraft that provides for the operation of both proprotors by either engine or by both engines. The drive system provides an interconnecting drive shaft that extends between and connects the engines in such a manner that power is transferred from one engine to the opposite proprotor in the case of an engine failure. Also, the arrangement provides for the operation of a redundant essential systems for the aircraft should an electrical or hydraulic system fail to operate properly.

13 Claims, 5 Drawing Sheets

DRIVE SYSTEM FOR TILTROTOR AIRCRAFT

This invention was made with Government support under Contract No. N00019-83-C-0166 awarded by Department of the Navy, Naval Air Systems Command. The Government has certain rights in this invention.

FIELD OF THE INVENTION

This invention relates generally to tiltrotor aircraft. More specifically, but not by way of limitation, this invention relates to a drive system interconnecting remotely located proprotors.

BACKGROUND OF THE INVENTION

Tiltrotor aircraft have been constructed in the past. Such aircraft include one or more engines that pivot from a position that is normal for propeller driven aircraft to a position that is normal for the rotor position of helicopters. The advantages of tilting the engines in this fashion are that the aircraft can take off and land vertically, hover when desired, fly more like an airplane in level flight, and obtain speeds greater than normally possible with helicopters.

The term "proprotor" is utilized herein to describe the airscrew since the airscrew provides the attributes of a propeller when in the level flight position and the attributes of a helicopter rotor when in the vertical position.

With dual engine tiltrotor aircraft, it is highly desirable to be able to provide power to both proprotors from either engine throughout the tilt range of the engines. The tilt range of the engines generally will be from about horizontal or 0 degrees to just past vertical or about 110 degrees.

Due to the desirability of providing power from either engine to both of the proprotors, apparatus must be provided for transferring the power. Since the engines are generally and in this instance located on the ends of the wings, any power transmission mechanism extending between the engines must extend along or through the wings. Accordingly, such apparatus is subjected to the angles of the sweep design of the wing plus the wing dihedral angle plus any flexure of the wing during operation.

It is also highly desirable to be able to provide redundant sources for electrical and hydraulic systems and to be able to power apparatus normally driven by the auxiliary power unit when the engines are not running. Such apparatus is necessarily relatively bulky and heavy and, thus, is preferably located somewhere other than adjacent to the wing tip mounted engines. The engines will, of course, have redundant electrical and hydraulic systems power available.

SUMMARY OF THE INVENTION

An object of this invention is to provide a drive mechanism for tiltrotor aircraft wherein power can be delivered from either or both engines to both of the proprotors in any position of the proprotors and at any power setting of the engine.

An additional object is to be able to provide the desired redundancy of various systems utilized in tiltrotor aircraft.

This invention then provides a system for driving a pair of spaced proprotors that are remotely located adjacent to opposite ends of the wing of a tiltrotor aircraft. The system comprises port and starboard engine pylons pivotally located with respect to the wing. Each engine has an engine output shaft connected with a gearbox for driving a propeller shaft which carries the proprotors. A drive shaft extending from the gearbox is connected to bevel gear/pivot which pivotally supports the pylon on the wing. An incremented shaft extends across and is mounted for rotation in the wing with the ends of the shaft connected with the pivots whereby each of the engines can drive either of the proprotors in any tilted position of the engines.

BRIEF DESCRIPTION OF THE DRAWING

The foregoing and additional objects and advantages of the invention will become more apparent as the following detailed description is read in conjunction with the accompanying drawing wherein like reference characters denote like parts in all views and wherein.

DETAILED DESCRIPTION OF THE PREFERRED EMBODIMENT

Figure 1:
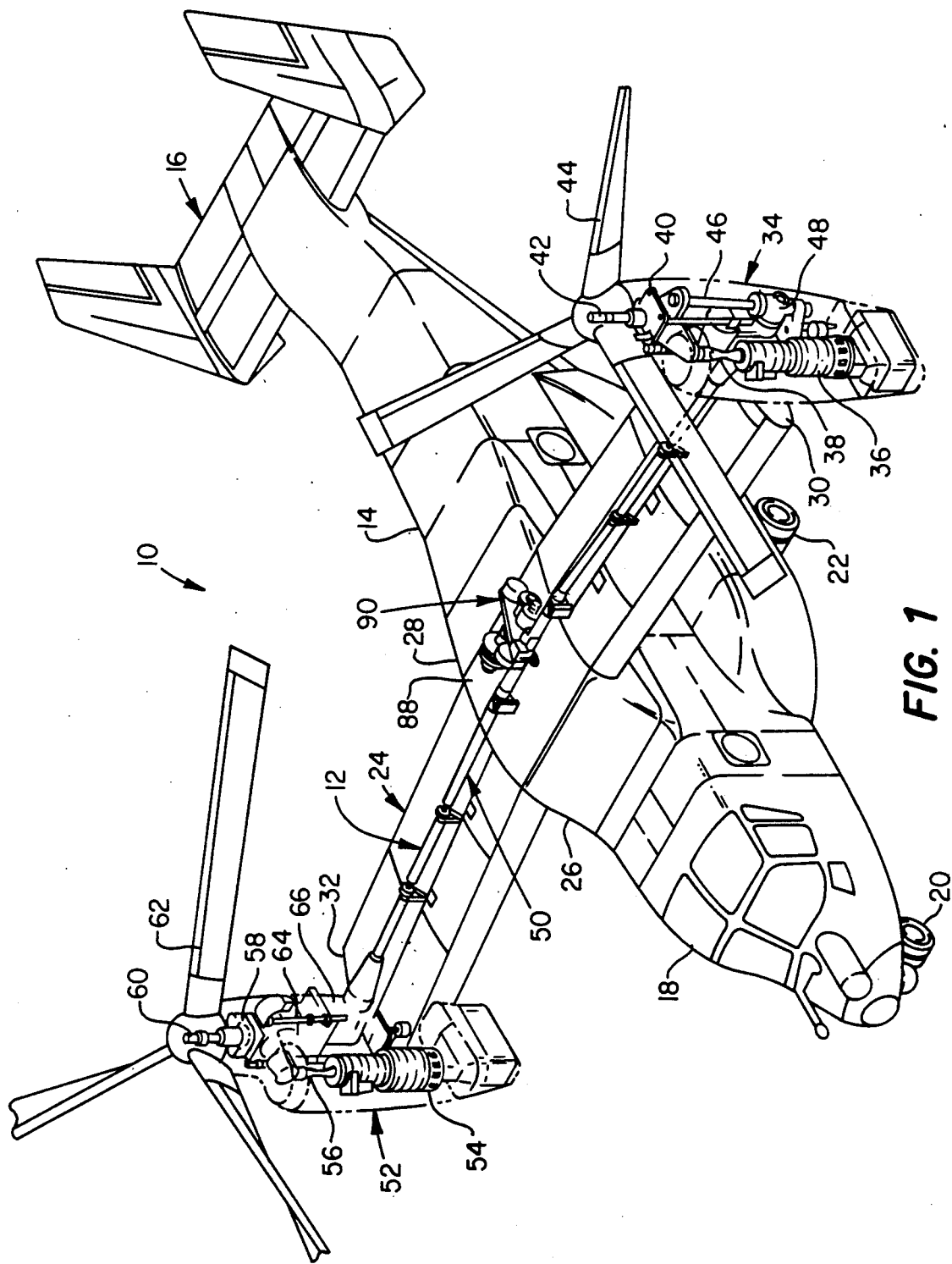
FIG. 1 is a pictorial view of a tiltrotor aircraft that includes a drive system constructed in accordance with the invention.

Referring to the drawing and to FIG. 1 in particular, shown therein and generally designated by the reference character 10 is a tiltrotor aircraft that includes a drive system generally designated by the reference character 12 that is constructed in accordance with the invention. The view of the aircraft in FIG. 1 has been customized so that it appears that certain portions of the skin of the aircraft are invisible to more clearly show portions of the drive system 12.

In addition to the drive system 12, the aircraft 10 includes a fuselage 14 which carries at its rear end an empennage assembly 16 and at its forward end a crew cockpit 18. Appropriate landing gear 20 and 22 can be seen extending below the aircraft.

As can be seen in FIG. 1, a portion of the drive system 12 extends through a wing assembly 24 that is connected to and extends transversely across the fuselage 14. Fairings 26 and 28 blend the wing into the fuselage contour. The wing assembly 24 on each side of the fuselage 14, is swept forward. The wing assembly 24, as it extends outwardly from each side of the fuselage 14, includes a dihedral angle. That is, the wing assembly 24 extends slightly upwardly toward the port wing tip 30 and the starboard wing tip 32.

Pivotally mounted on the port wing tip 30 is a port pylon assembly 34 that includes an engine 36 having an output shaft 38 that is connected to a reducing gearbox 40. The gearbox 40 includes a propeller shaft 42 on which is mounted a port proprotor 44.

Gearbox 40 also includes a drive shaft 46 that extends downwardly into a bevel gear/pivot assembly 48 which serves as a pivot for the pylon 34 on the wing assembly 24 and also connects the drive shaft 46 with a shaft assembly 50 that extends across the wing 24.

Similarly, a starboard pylon 52 is located adjacent the starboard wing tip 32. The starboard pylon 52 includes an engine 54 having an engine output shaft 56 that extends into a gear reducer 58. The gear reducer 58 includes an upwardly extending propeller shaft 60 which carries at its upper end a second or starboard proprotor 62. The gear reducer 58 also includes a shaft 64 that extends downwardly into a bevel gear and pivot assembly 66 that is utilized to pivotally connect the starboard pylon 52 with the wing assembly 24.

As can be appreciated from FIG. 1, the shaft assembly 50 extends across the wing assembly 24 of the aircraft 10 and has one end connected to the bevel gear and pivot assembly 48 at the port wing tip 30. The other end of the shaft assembly 50 is connected with the bevel gear and pivot assembly 66 at the starboard wing tip 32.

The starboard engine 54 is connected to the starboard proprotor 62 through the engine output shaft 56, the gear reducer 58 and the prop shaft 60. The starboard engine 54 is also connected to the port proprotor 44 through the engine output shaft 56, the gear reducer 58, the bevel gear and pivot assembly and shaft assembly 50. It will also be appreciated that the port engine 36 is similarly connected to both the port proprotor 44 and to the starboard proprotor 62. As arranged, either engine can drive either proprotor or both proprotors and both engines operating simultaneously will drive both proprotors supplying appropriate power required to the proprotor needing the power as is required. Although not illustrated, appropriate controls are provided to coordinate the speed of the engines 36 and 54.

Figure 2:
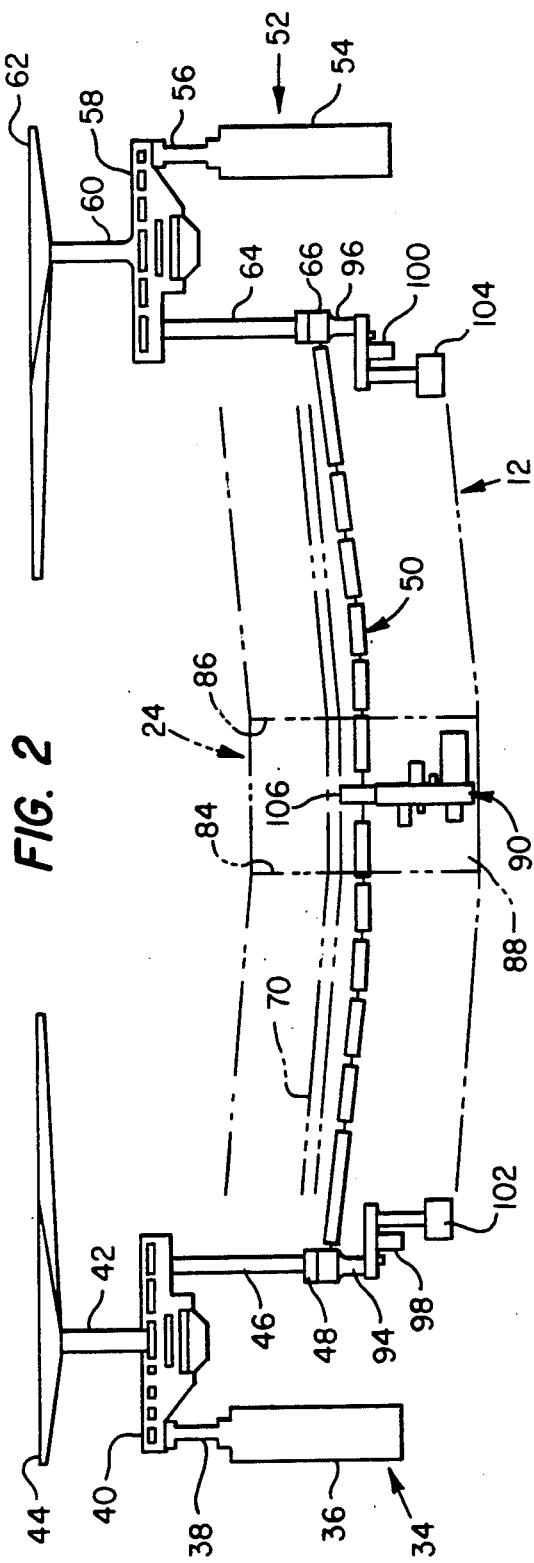
FIG. 2 is a schematic view of the drive system for the tiltrotor aircraft illustrated in FIG. 1 shown schematically.

Referring now to FIG. 2, the drive system 12 is shown therein schematically for clarity. The wing assembly 24 is shown in phantom lines. A main wing spar 70 provides support across the wing assembly 24 for a plurality of spaced bearings and the like to aid in supporting the shaft assembly 50 is also shown in phantom lines. The requirement for a plurality of bearings along the a shaft assembly 50 is necessitated by the incremental construction of the shaft assembly 50. The shaft assembly 50 has been divided into segments or increments for the purpose of accommodating the forward sweep of the wing assembly 24 as can be clearly seen in FIG. 2, to accommodate the wing dihedral angle which is not shown, and to accommodate the flexure of the wing assembly 24 during operation of the aircraft 10. The number of increments illustrated in FIG. 2 is not intended to be binding, but is shown only for purposes of illustration, the exact number of increments necessary will depend upon the amount of the sweep of the wing, the dihedral angle, also the amount of flexure in the wing assembly 24. In any event, each increment or segment of the shaft assembly 50 is connected to the other so that the shaft assembly 50 rotates as a single unit.

Figure 3:
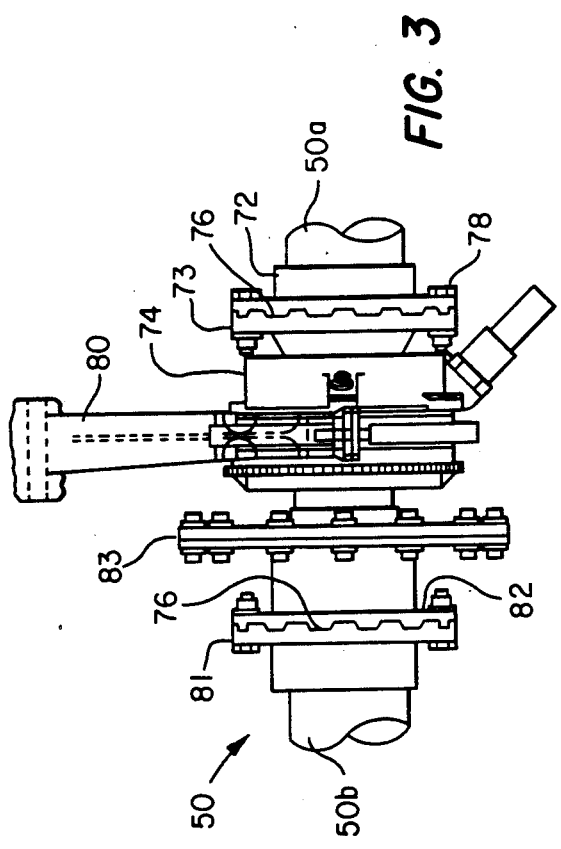
FIG. 3 is an enlarged view of a coupling/bearing arrangement utilized in the drive apparatus.

Typical of a bearing support end connection for the shaft segments is shown in FIG. 3. As illustrated therein, end 50a of one shaft segment is connected to an end 50b of another shaft segment. The end 50a is connected with one-half of a face-type coupling 72 which mates with the other half 73 thereof which is mounted on a support bearing 74. It will be noted that the two halves of face-type coupling assembly 72 are provided with a gear-like configuration 76 which mesh when secured together by fasteners 78. Such an arrangement avoids backlash between the two halves. A slip-joint (not shown), located at the pivot assemblies 48 and 66 compensate for any axial length problems when assembling the shaft assembly 50.

As shown in FIG. 3, the bearing 74 is supported on a support member 80 which extends to the main wing spar 70. Of course, the shape, size and arrangement of the support members 80 will be in accordance with the requirements of a particular wing design.

The end 50b of a shaft segment is similarly connected with a face-type coupling 81 having the geared face arrangement 76 there as previously described. However, it will be noted that the second half 82 of the coupling is connected to a constant velocity, diaphragm-type drive joint 83. The drive joint 83 is provided for the purpose of not only transferring torque through the shaft assembly 50 from one segment to the other, but also for the purpose of accommodating for angular misalignment between the shaft segments previously discussed.

The drive shaft assembly 50 consists of a series of shaft segments or increments having their ends interconnected by both face-type couplings to avoid backlash and to permit some misalignment while at the same time, being connected by the diaphragm-type couplings 83 which require no lubrication and permit further misalignment between adjacent segments.

As shown in FIG. 2, a pair of spaced structural wing ribs 84 and 86 are located in a mid-wing 88 portion of the wing assembly 24. The ribs 84 and 86 generally coincide with the structural members of the fuselage 14. Located in the mid-wing portion 88 aft of the main wing spar 70 is a mid-wing gearbox that is generally designated by the reference character 90. The mid-wing gearbox assembly 90 will be discussed more fully in connection with FIGS. 4 and 6–8.

Figure 5:
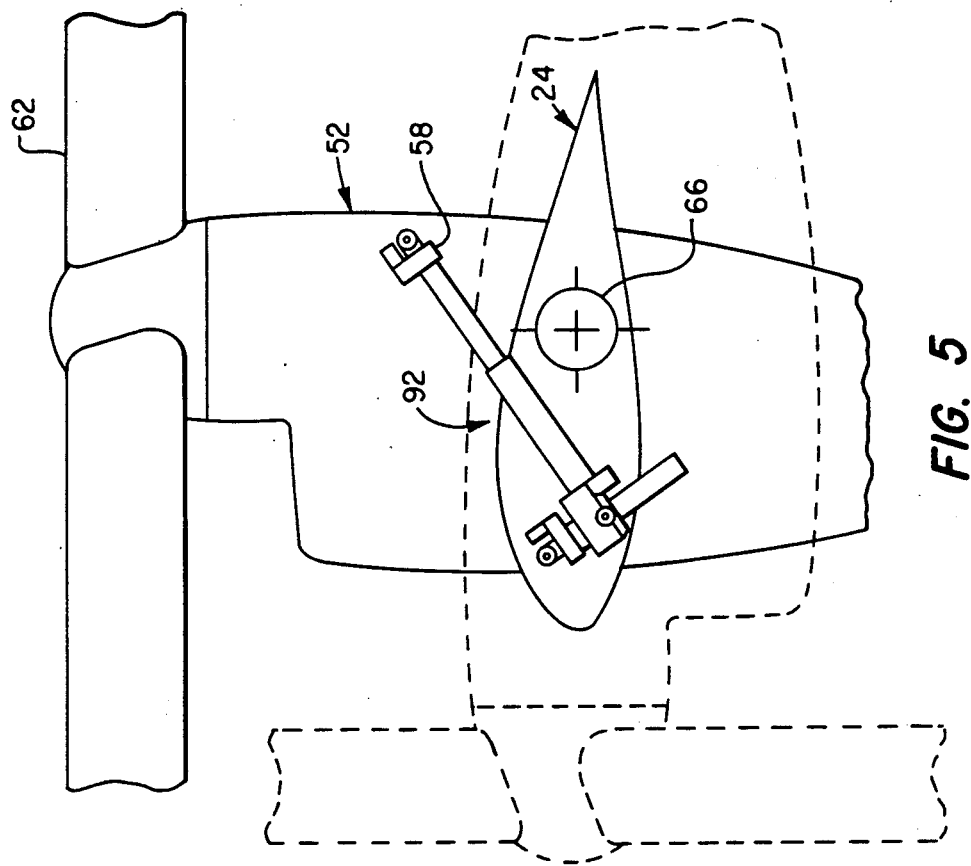
FIG. 5 is a fragmented view illustrating schematically one method for tilting the engines and the proprotors of the aircraft illustrated in FIG. 1.

FIG. 5 illustrates, very schematically, one method for pivoting the pylons 34 and 52 relative to the wing assembly 24. As shown therein, the starboard pylon 52 is illustrated in solid lines in the vertical position relative to the angle attack of the wing assembly 24. The pivot point of the pylon 52 about the wing of the assembly 24 created by the bevel gear and pivot 66. To cause the pylon 52 to pivot into the position illustrated by dash lines in FIG. 5, a compound screw jack 92 is connected between the gear reducer 58 and the wing assembly 24. As the screw jack 92 is actuated, the members thereof are caused to telescope or extend which in turn changes the distance between the attachment of the screw jack 92 to the wing assembly 24 and to the gear reducer 58. Such change in length or distance positions the pylon 52 at any desired angular position between the horizontal and, as previously mentioned, about 110 degrees therefrom or 10 degrees past vertical.

As previously mentioned, it is desirable to provide redundant systems for the hydraulic and electrical systems beyond the normal systems for aircraft of this type. Accordingly, such redundancy is provided for by extending auxiliary shafts 94 and 96 (see FIG. 2) from the bevel gear and pivot assemblies 48 and 66 respectively. The auxiliary shafts 94 and 96 each drive, through appropriate gear mechanisms, generators 98 and 100 and hydraulic pumps 102 and 104. In addition to the redundancy of the apparatus between the apparatus in the two pylons 34 and 52, the previously mentioned mid-wing gearbox assembly 90 also provides additional generators, air compressors and hydraulic pumps as will be described.

Figure 4:
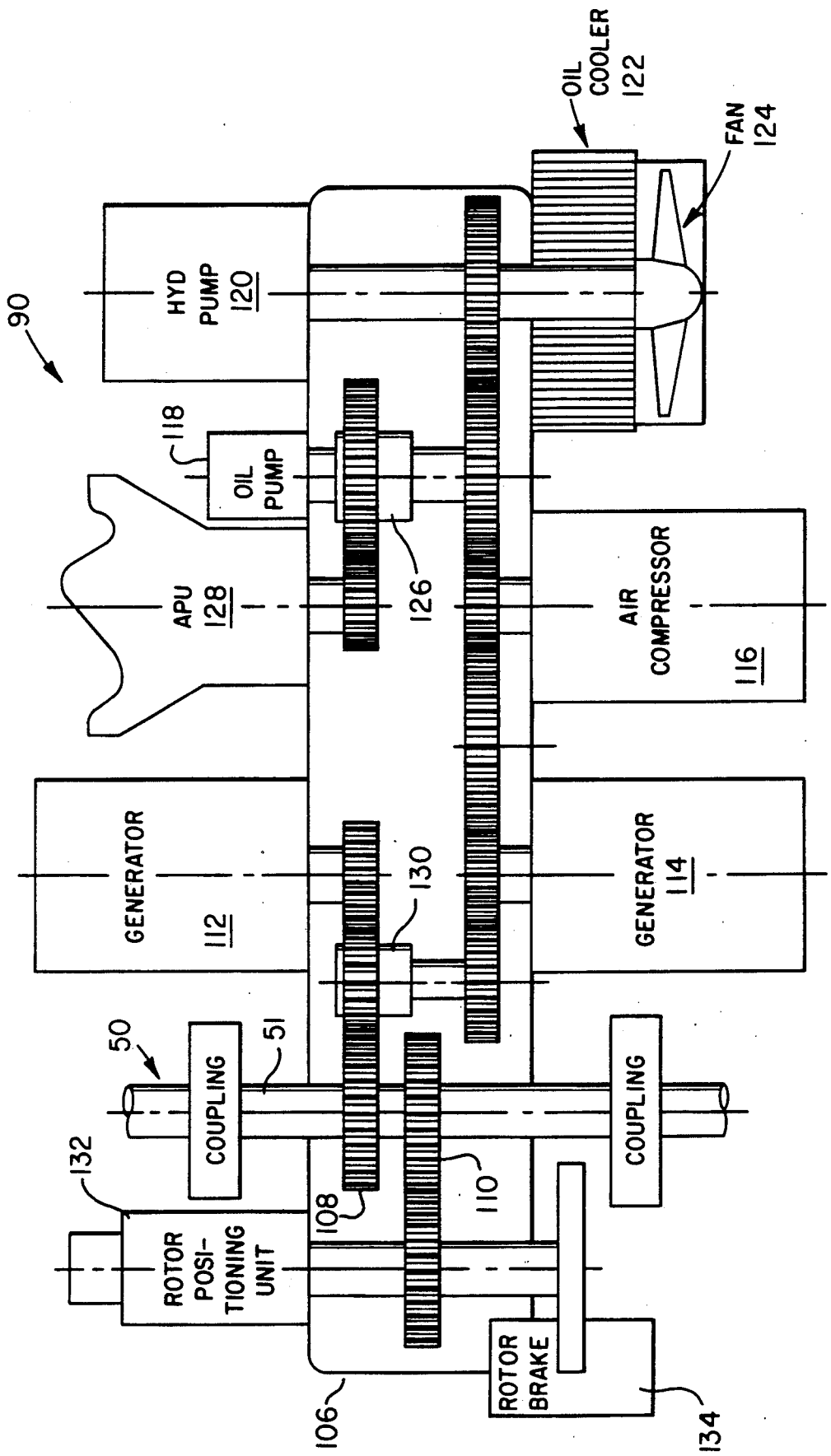
FIG. 4 is a schematic view of a mid-wing gearbox for the aircraft that is also constructed in accordance with the invention.

As shown in FIG. 4, the mid-wing gearbox assembly 90 includes a case 106 that is mounted as will be described. Extending through the case 106 is a shaft that is effectively a segment 51 of the shaft assembly 50. Mounted on the shaft segment 51 are gears 108 and 110. The gear 108, through appropriate gearing drives generators 112 and 114, an air compressor 116, an oil pump 118 and a hydraulic pump 120. In addition, an oil cooler 122 and fan 124 are driven thereby. When the engines 36 and 54 are running, the apparatus in the gearbox assembly 90 is driven through the shaft segment 51 and gear 108 with an overrunning clutch 126 provided to prevent driving into an auxiliary power unit 128 which is mounted on the case 106. When the engines 36 and 54 are not operating, and it is desired to power the apparatus in the gear box assembly 90, the auxiliary power unit 128 is actuated and drives in reverse through the system to drive the previously mentioned apparatus. Driving in reverse through the shaft segment 51 is prevented by an overrunning clutch 130.

In addition to the foregoing, the mid-wing gearbox 90 also includes a rotor positioning unit 132 and a rotor brake 134 which are utilized to position and lock the proprotor blades during folding operation or storage of the aircraft.

As mentioned earlier, the redundancy provided by the mid-wing gearbox 90 is highly desirable, but due to the weight and space required thereby, it could be difficult to provide all the desired equipment at the engines. Accordingly, the mid-wing gearbox assembly 90 along with the accompanying apparatus driven thereby and along with the auxiliary power unit 128 are located in the mid-wing section 88 of the wing assembly 24. Positioning such apparatus in this section avoids the application of additional weight to the cantilevered portion of the wing assembly 24 of the aircraft 10 and yet provides for the apparatus to be driven by the engines 36 and 54 when the aircraft engines are in operation.

One of the problems in mounting such apparatus is not only the weight of the apparatus itself and the bulk thereof, but also the flexure and deflection of the wing assembly 24 and other aircraft structural portions. To alleviate these problems, the mounting arrangement illustrated in FIGS. 6, 7 and 8 has been utilized.

Figure 6:
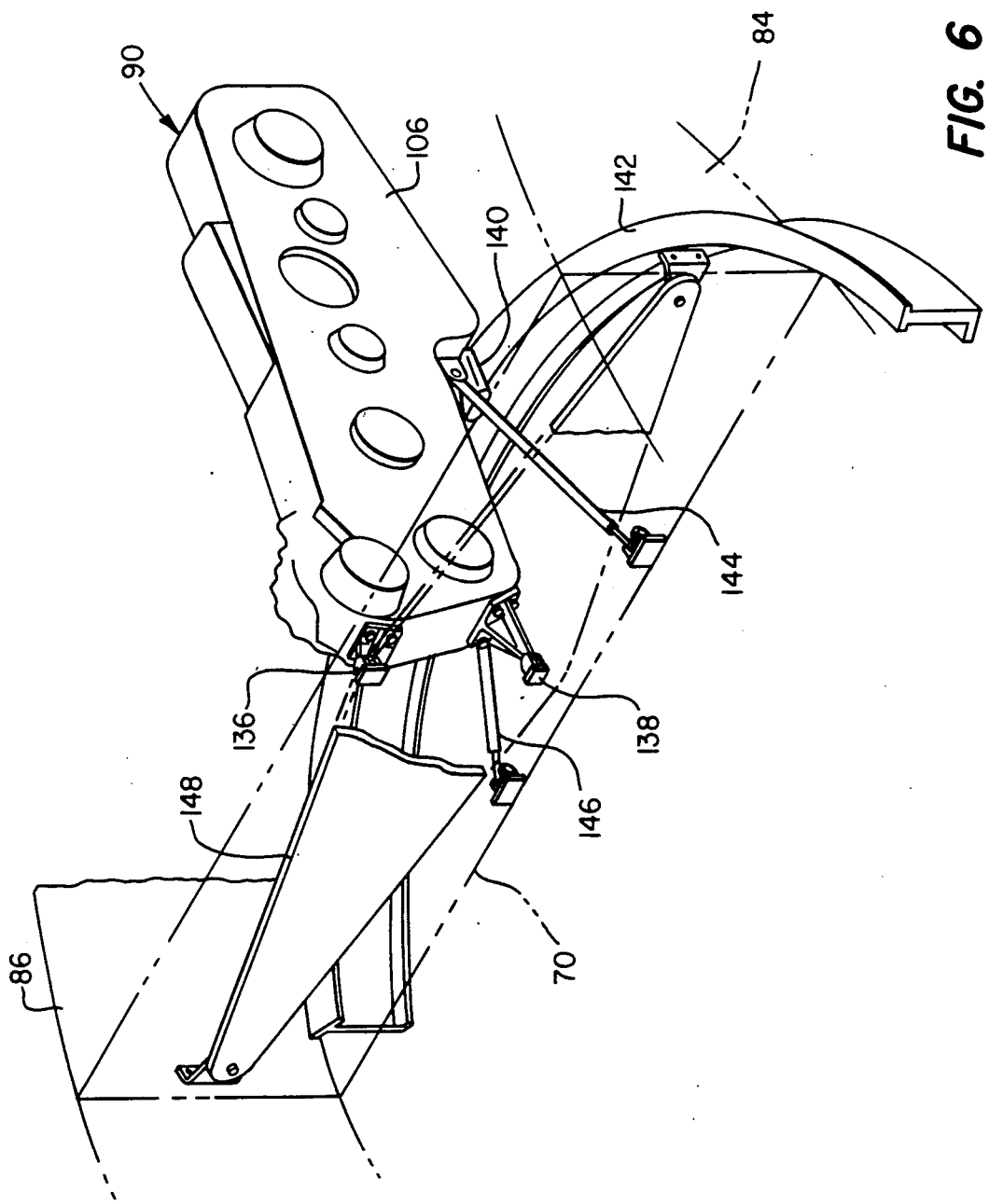
FIG. 6 is a fragmented view, somewhat schematic illustrating the mounting of the mid-wing gear case.

As shown in FIG. 6, the case 106 of the mid-wing gearbox assembly 90 is provided with three mounting points. Those points are an upper forward mounting point 136, a lower forward mounting point 138 and a lower central mounting point 140. The lower central point 140 is located near the center of gravity of the gearbox assembly 90 and rests upon a curved structural member 142 which is a portion of the fuselage 14. Extending therefrom are a pair of divergent tension members 144 and 146 are connected to the wing spar 70 to aid in supporting the gear case 106 against lateral movement.

The forward mounting points 136 and 138 are both attached to a laterally extending support member 148 which is somewhat diamond shaped in configuration (see FIG. 6) having its broadest section at the mounting points 136 and 138 and tapering toward the ends thereof. The ends of the lateral support member 148 are connected to wing ribs 84 and 86. The wing rib 84 is shown in phantom and the other rib 86 is shown in solid lines.

Figure 7:
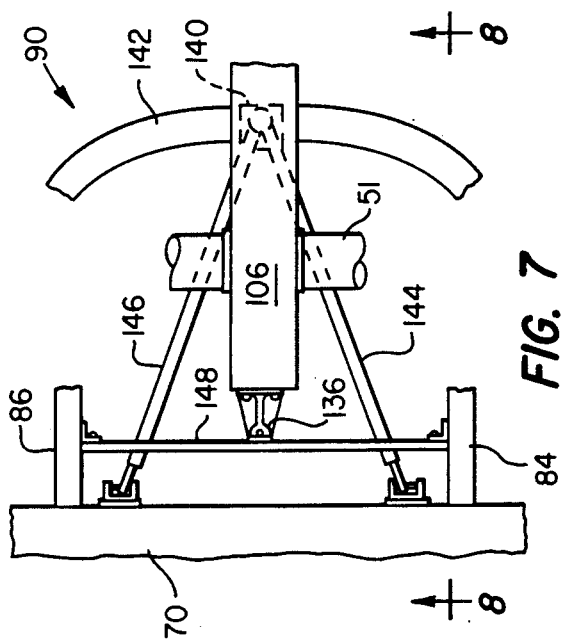
FIG. 7 is a top view of a portion of the apparatus illustrated in FIG. 6.
Figure 8:
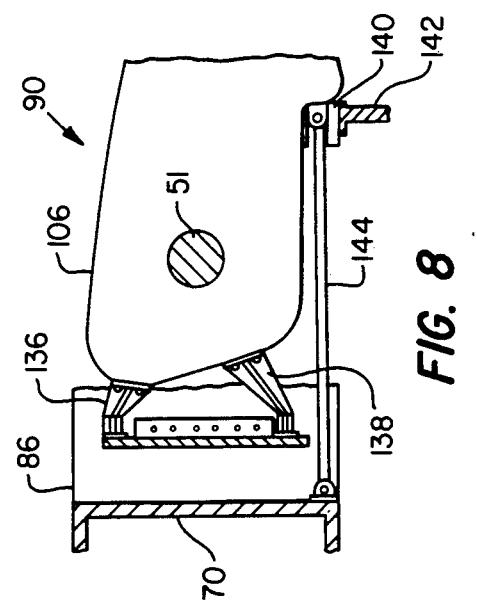
FIG. 8 is a view taken generally along a line 8—8 of FIG. 7.

It is believed that the mounting structure may be more easily appreciated when viewing the top plan view of FIG. 7 and the side elevation view of FIG. 8. FIGS. 7 and 8 clearly illustrate the mounting arrangement so that it can be appreciated that deflections in the wing assembly 24 during operation of the aircraft are not be imposed on the gear case 106 or any of the auxiliary apparatus attached thereto.

OPERATION OF THE EMBODIMENT OF FIG. 1

If the aircraft 10 is to be utilized in the helicopter mode, the pylons 52 and 34 are positioned as illustrated in FIG. 1. With the engines 36 and 54 in operation, the proprotors 44 and 62 are caused to rotate in opposite directions due to the components of the drive system 12. Accordingly, lift is imparted to the aircraft 10 and the amount of force imposed thereon depends to some extent to the pitch afforded by the proprotors 44 and 62. The pitch is, of course, variable to enable maneuvering of the aircraft 10. Depending upon the type of aircraft desired, the pylons 34 and 52 can be tilted by actuation of the screw jacks 92 so that forward, or for that matter, rearward motion can be imparted to the aircraft 10.

As the aircraft 10 gains speed, further tilting of the pylons 34 and 52 can be obtained by actuation of the screw jacks 92 until the pylons are lying parallel to the chord of the wing. In this condition, the aircraft 10 is in a normal propeller driven aircraft mode.

It should be pointed out that during the operation of the aircraft 10, should either of the engines go out, the opposite engine will take over and drive the proprotors 44 and 62 through the drive system 12 described. The shaft assembly 50 which extends through the wing assembly 24 transfers power from one engine to the opposite rotor. Should one of the engines be loaded greater than the other, the opposite engine, that is, the more lightly loaded engine, will automatically assume a portion of the load due to its interconnection through the shaft assembly 50.

In the event that a failure of one of the hydraulic pumps or electrical generators should occur, the redundant apparatus are in operation and will continue to provide the necessary hydraulic and electrical power for operation of the aircraft.

Upon landing or if the engines 36 and 54 are not operating, it is possible through the operation of the auxiliary power unit 128 to supply electrical and hydraulic power to the aircraft 10.

The use of separate gearboxes, such as the boxes 40 and 48 in the pylon 34 and boxes 58 and 66 in the pylon 52 provides a less complex structure for manufacturing. In addition, separate boxes makes maintenance of the aircraft much easier since each can be easily reached, removed and installed without the necessity for total disassembly of the drive system 12.

Having described but a single embodiment of the invention, it will be understood that various changes and modifications can be made thereto without departing from the spirit and scope of the invention.

What is claimed is:

1. A system for driving a pair of spaced proprotors that are remotely located adjacent to opposite ends of the wing of a tiltrotor aircraft, said system comprising:
port and starboard engine pylons pivotally located on the ends of said wing, each said pylon including an engine having an output shaft;
gearbox means for each engine located in each pylon and drivingly connected to said engine output shaft, said gearbox means each having a propeller shaft carrying one of the proprotors and each having a drive shaft;

pivot means for pivotally supporting each engine on said wing, said pivot means having an input connected with said drive shaft and having an output;

an extendable member operably connected at a first end with each said pylon and at a second end with the wing for pivoting said pylons including said engines, gearbox means and proprotors through an angle of about 100°; and shaft means extending across and mounted for rotation on said wing, said shaft means having port and starboard ends connected to the outputs from said pivot means, thereby connecting each engine to both proprotors whereby either engine can drive either or both proprotors.

2. The system of claim 1 wherein said shaft means includes:

a plurality of shaft members mounted for rotation on said wing; and a plurality of coupling members connecting said shaft members, whereby said shaft means can accommodate flexure of said wing without bending said shaft members.

3. In a winged, tiltrotor aircraft having engines located on said wing and a mid-wing located gearbox assembly for carrying an auxiliary power unit, a hydraulic pump, a compressor and a generator, said wing including a main spar and ribs, an improved mounting system comprising:

a gearbox case having three mounting members located substantially in a single plane;

a mounting beam extending generally parallel to said main spar having each end connected to adjacent ribs;

a fuselage frame member located below said case; and means for connecting two of said mounting members to said beam and for connecting the other said mounting member to said frame member, whereby deflections of said wing and fuselage are not imposed on said gear case.

4. The apparatus of claim 3 and also including divergent tension members having one end connected to said other mounting member and the other ends thereof connected to said main spar for supporting said case against lateral movement.

5. The apparatus of claim 3 wherein the center of gravity of said gearbox assembly is located substantially over said frame member.

6. A system for driving a pair of spaced proprotors that are remotely located adjacent to opposite ends of the wing of a tiltrotor aircraft, said system comprising:

port and starboard engine pylons pivotally located on the ends of said wing, and said pylon including an engine having an output shaft;

gearbox means for each engine located in each pylon and drivingly connected to said engine output shaft, said gearbox means each having a propeller shaft carrying one of the proprotors and each having a drive shaft;

pivot means for pivotally supporting each engine on said wing, said pivot means having an input connected with said drive shaft and having an output; and, shaft means extending across and mounted for rotation on said wing, said shaft means having port and starboard ends connected to the outputs from said pivot means, thereby connecting each engine to both proprotors whereby either engine can drive either or both proprotors, said shaft means including a plurality of shaft members mounted for rotation on said wing and a plurality of coupling members connecting said shaft members, whereby said shaft means can accommodate flexure of said wing without bending said shaft members, a first portion of said coupling members providing a constant velocity flexible connection between said shaft members and a second portion of said coupling members comprising face-type meshing members to reduce backlash.

7. A system for driving a pair of spaced proprotors that are remotely located adjacent to opposite ends of the wing of a tiltrotor aircraft, said system comprising:

port and starboard engine pylons pivotally located on the ends of said wing, each said pylon including an engine having an output shaft;

gearbox means for each engine located in each pylon and drivingly connected to said engine output shaft, said gearbox means each having a propeller shaft carrying one of the proprotors and each having a drive shaft, said engine output shafts rotate in the same direction and the proprotors rotate in opposite directions and one of said gearbox means includes gear means for causing said propeller shafts to rotate in opposite directions;

pivot means for pivotally supporting each engine on said wing, said pivot means having an input connected with said drive shaft and having an output; and, shaft means extending across and mounted for rotation on said wing, said shaft means having port and starboard ends connected to the outputs from said pivot means, thereby connecting each engine to both proprotors whereby either engine can drive either or both proprotors.

8. A system for driving a pair of spaced proprotors that are remotely located adjacent to opposite ends of the wing which is mounted on a fuselage of a tiltrotor aircraft, said system comprising:

port and starboard engine pylons pivotally located on the ends of said wing, each said pylon including an engine having an output shaft;

gearbox means for each engine located in each pylon and drivingly connected to said engine output shaft, said gearbox means each having a propeller shaft carrying one of said proprotors an each having a drive shaft;

pivot means for pivotally supporting each engine on said wing, said pivot means having an input connected with said drive shaft and having an output;

shaft means extending across and mounted for rotation on said wing, said shaft means having port and starboard ends connected to the outputs form said pivot means, thereby connecting each engine to both proprotors whereby either engine can drive either or both proprotors, said shaft means comprising a central shaft member located generally centrally of said wing and parallel to a wing spar, said central shaft member journaled in a case and carrying a drive gear thereon in said case whereby said drive gear is driven by said engine through said shaft means;

a lateral support beam extending parallel to said spar and has each end connected to a wing rib; and a mid-wing gearbox including said case having upper and lower front supports attached to said lateral support beam generally centrally of said wing, said case having a third support attached to said fuselage generally centrally of said wing whereby flexure of said wing has little effect on said mid-wing gear box.

9. The system of claim 8 and also including proprotor brake means mounted on said case for acting upon said drive gear to permit and prevent rotation of said shaft means and proprotors.

10. The system of claim 8 wherein said mid-wing gearbox has a plurality of outputs and also includes:
   a hydraulic pump mounted on said case and arranged to be driven by said mid-wing gearbox;
   generator means mounted on said case arranged to be driven by said mid-wing gearbox; and
   auxiliary power means mounted on said mid-wing gearbox for driving said mid-wing gearbox when said engines are not operating.

11. The system of claim 8 and also including a pair of tension members having one end of each connected to a common point on said mid-wing gearbox aft of said spar, said tension members diverging and having divergent ends connected to said spar to resist lateral and torsional loads on said mid-wing gear box.

12. A system for driving a pair of spaced proprotors that are remotely located adjacent to opposite ends of the wing of a tiltrotor aircraft, said system comprising:
   port and starboard engine pylons pivotally located on the ends of said wing, each said pylon including an engine having an output shaft;
   gearbox means for each engine located in each pylon and drivingly connected to said engine output shaft, said gearbox means each having a propeller shaft carrying one of the proprotors and each having a drive shaft;
   pivot means for pivotally supporting each engine on said wing, said pivot means having an input connected with said drive shaft and having an output;
   actuating means including a power driven screw jack having one end connected to said wing and the other connected to said gearbox means for pivoting the pylons including said engines, gearbox means and proprotors through an angle of about 100°; and
   shaft means extending across and mounted for rotation on said wing, said shaft means having port and starboard ends connected to the outputs from said pivot means, thereby connecting each engine to both proprotors whereby either engine can drive either or both proprotors.

13. A system for driving a pair of proprotors remotely spaced on a tiltrotor aircraft having a wing that includes a main spar and at least a pair of spaced ribs and a fuselage comprising:
   a pair of engines mounted on the wing, each connected to rotate one of said proprotors;
   each of said engines pivotally connected to rotate adjacent said aircraft to enable horizontal and vertical flight;
   shaft means extending between and coupled to said engines wherein either engine can drive either or both of said engines;
   a central shaft member of said shaft means located generally centrally of the wing and parallel to the wingspar, said central shaft member journaled in a case and carrying a drive gear thereon in said case whereby said drive gear is driven by said engine through said shaft means;
   a lateral support beam extending parallel to the spar and has each end connected to a wing rib; and
   a mid-wing gearbox including a case having upper and lower front supports attached to said lateral support beam generally centrally of said wing, said case having a third support attached to the fuselage generally centrally of the wing whereby flexure of the wing has little effect on said mid-wing gear box.

* * * * *